United States Patent
Fleeter et al.

(10) Patent No.: US 8,494,443 B2
(45) Date of Patent: Jul. 23, 2013

(54) LOW-COST SATELLITE COMMUNICATION SYSTEM

(75) Inventors: Richard D. Fleeter, Reston, VA (US);
John E. Hanson, Mountain View, CA (US); Scott A. McDermott, Washington, DC (US); Raymond G. Zenick, Jr., Solana Beach, CA (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 2338 days.

(21) Appl. No.: 10/992,173

(22) Filed: Nov. 18, 2004

(65) Prior Publication Data

US 2005/0090199 A1    Apr. 28, 2005

Related U.S. Application Data

(60) Division of application No. 10/054,175, filed on Jan. 22, 2002, now Pat. No. 6,856,606, which is a continuation-in-part of application No. 09/045,970, filed on Mar. 21, 1998, now Pat. No. 6,396,819.

(51) Int. Cl.
*H04B 7/185*    (2006.01)

(52) U.S. Cl.
USPC ............ 455/12.1; 455/98; 455/427; 455/430; 455/431

(58) Field of Classification Search
None
See application file for complete search history.

(56) References Cited

U.S. PATENT DOCUMENTS

| | | | |
|---|---|---|---|
| 4,486,739 A | 12/1984 | Franaszek et al. | |
| 4,649,396 A | 3/1987 | Friedman | |
| 4,876,737 A | 10/1989 | Woodworth et al. | |
| 4,901,307 A | 2/1990 | Gilhousen et al. | |
| 5,109,390 A | 4/1992 | Gilhousen et al. | |
| 5,309,474 A | 5/1994 | Gilhousen et al. | |
| 5,376,778 A | 12/1994 | Kreft | |
| 5,490,165 A | 2/1996 | Blakeney, II et al. | |
| 5,537,397 A | 7/1996 | Abramson | |
| 5,559,790 A | 9/1996 | Yano et al. | |

(Continued)

FOREIGN PATENT DOCUMENTS

DE    102004016548 A1    10/2005
EP    1406207 A1    4/2004

OTHER PUBLICATIONS

Fleeter, Office Action, U.S. Appl. No. 13/422,173, Jun. 8, 2012, 16 pgs.

(Continued)

*Primary Examiner* — Yuwen Pan
*Assistant Examiner* — Fanghwa Wang
(74) *Attorney, Agent, or Firm* — Morgan, Lewis & Bockius LLP

(57) ABSTRACT

A communication system is provided that allows the use of low-cost, low-power remote terminal units that communicate substantially asynchronously and independently to a base station. To minimize cost and complexity, the remote terminal units are configured similarly, including the use of substantially identical transmission schemes, such as a common Direct Sequence Spread Spectrum (DSSS) code. To minimize collisions among transmissions, the communication system is designed to use a high-gain antenna with a limited field of view, to limit the number of cotemporaneous, or overlapping transmissions that are received at the base station. To cover a wide area, the limited field of view is swept across the area of coverage. To overcome potential losses caused by collisions, the remote terminal units are configured to repeat transmissions; to minimize repeated collisions, the repeat interval and/or duration is randomized.

5 Claims, 11 Drawing Sheets

U.S. PATENT DOCUMENTS

| | | | |
|---|---|---|---|
| 5,566,168 | A | 10/1996 | Dent |
| 5,568,472 | A | 10/1996 | Umeda et al. |
| 5,570,350 | A | 10/1996 | Myer et al. |
| 5,612,949 | A | 3/1997 | Bennett |
| 5,625,629 | A | 4/1997 | Wenk |
| 5,640,166 | A * | 6/1997 | Siwiak .......................... 342/354 |
| 5,668,556 | A * | 9/1997 | Rouffet et al. ................. 342/354 |
| 5,694,396 | A | 12/1997 | Firouzbakht et al. |
| 5,697,050 | A | 12/1997 | Wiedeman |
| 5,724,384 | A | 3/1998 | Kim et al. |
| 5,758,260 | A | 5/1998 | Wiedeman |
| 5,790,070 | A * | 8/1998 | Natarajan et al. ............. 342/354 |
| 5,796,777 | A | 8/1998 | Terlep et al. |
| 5,815,071 | A | 9/1998 | Doyle |
| 5,818,883 | A | 10/1998 | Smith et al. |
| 5,835,069 | A | 11/1998 | Skoog |
| 5,841,765 | A | 11/1998 | Fielding et al. |
| 5,872,777 | A | 2/1999 | Brailean et al. |
| 5,920,278 | A | 7/1999 | Tyler et al. |
| 5,983,111 | A | 11/1999 | Kim |
| 5,999,561 | A | 12/1999 | Naden et al. |
| 6,052,561 | A | 4/2000 | Rudowicz et al. |
| 6,084,919 | A | 7/2000 | Kleider et al. |
| 6,088,413 | A | 7/2000 | Autry et al. |
| 6,100,806 | A | 8/2000 | Gaukel |
| 6,121,922 | A | 9/2000 | Mohan |
| 6,128,276 | A | 10/2000 | Agee |
| 6,128,469 | A | 10/2000 | Zenick et al. |
| 6,151,313 | A | 11/2000 | Abramson |
| 6,163,681 | A | 12/2000 | Wright et al. |
| 6,185,245 | B1 | 2/2001 | Kim |
| 6,188,682 | B1 | 2/2001 | Takagi et al. |
| 6,205,167 | B1 | 3/2001 | Kamgar et al. |
| 6,226,531 | B1 | 5/2001 | Holt et al. |
| 6,307,840 | B1 | 10/2001 | Wheatley, III et al. |
| 6,317,029 | B1 | 11/2001 | Fleeter |
| 6,339,611 | B1 | 1/2002 | Antonio et al. |
| 6,349,110 | B1 | 2/2002 | Davidovici et al. |
| 6,353,730 | B1 | 3/2002 | Buettner et al. |
| D455,641 | S | 4/2002 | Trifilio |
| 6,373,831 | B1 | 4/2002 | Secord et al. |
| 6,396,819 | B1 | 5/2002 | Fleeter et al. |
| 6,421,373 | B1 | 7/2002 | Saito |
| 6,438,118 | B1 | 8/2002 | Matui |
| 6,507,602 | B1 | 1/2003 | Dent |
| 6,510,172 | B1 | 1/2003 | Miller |
| 6,529,488 | B1 | 3/2003 | Urs et al. |
| 6,549,559 | B2 | 4/2003 | Kamgar et al. |
| 6,574,205 | B1 | 6/2003 | Sato |
| 6,628,699 | B2 * | 9/2003 | Ramberg et al. ............... 375/148 |
| 6,639,906 | B1 | 10/2003 | Levin |
| 6,683,605 | B1 | 1/2004 | Bi et al. |
| 6,720,801 | B2 | 4/2004 | Houlberg |
| 6,728,298 | B1 | 4/2004 | Okubo et al. |
| 6,754,190 | B2 | 6/2004 | Gurney et al. |
| 6,763,056 | B1 | 7/2004 | Ohsuge |
| 6,768,729 | B1 | 7/2004 | Ohsuge |
| 6,799,094 | B1 | 9/2004 | Vaida et al. |
| 6,826,169 | B1 | 11/2004 | Fukumasa et al. |
| 6,876,645 | B1 | 4/2005 | Guey et al. |
| 6,894,995 | B2 | 5/2005 | Chitrapu et al. |
| 6,944,149 | B1 | 9/2005 | Kim et al. |
| 6,985,512 | B1 | 1/2006 | McDermott et al. |
| 7,006,032 | B2 | 2/2006 | King et al. |
| 7,053,767 | B2 | 5/2006 | Petite et al. |
| 7,110,435 | B1 | 9/2006 | Sorrells et al. |
| 7,131,136 | B2 | 10/2006 | Monroe |
| 7,203,630 | B2 | 4/2007 | Kolb et al. |
| 7,227,884 | B2 | 6/2007 | McDermott |
| 7,236,778 | B2 | 6/2007 | Schreiber |
| D554,474 | S | 11/2007 | Miller |
| D574,221 | S | 8/2008 | Allen |
| 7,430,257 | B1 | 9/2008 | Shattil |
| 7,433,391 | B2 | 10/2008 | Stafford et al. |
| D582,918 | S | 12/2008 | Scott |
| 7,592,953 | B2 | 9/2009 | Morana |
| 7,706,748 | B2 | 4/2010 | Dutta |
| 7,848,458 | B2 | 12/2010 | Ochiai et al. |
| 7,876,259 | B2 | 1/2011 | Schuchman |
| 8,054,866 | B2 | 11/2011 | Sasaoka et al. |
| 2002/0024965 | A1 | 2/2002 | Lee |
| 2002/0067759 | A1 | 6/2002 | Ertel et al. |
| 2002/0089434 | A1 | 7/2002 | Ghazarian |
| 2002/0097690 | A1 | 7/2002 | Fleeter et al. |
| 2002/0173888 | A1 | 11/2002 | Shelton et al. |
| 2002/0177476 | A1 | 11/2002 | Chou |
| 2002/0191632 | A1 | 12/2002 | McDermott |
| 2003/0063576 | A1 | 4/2003 | DiFazio |
| 2003/0123384 | A1 | 7/2003 | Agee |
| 2003/0161428 | A1 | 8/2003 | Garrett et al. |
| 2003/0202485 | A1 | 10/2003 | Mansfield |
| 2003/0204378 | A1 | 10/2003 | Cai |
| 2003/0235148 | A1 | 12/2003 | Yang |
| 2004/0001534 | A1 | 1/2004 | Yang |
| 2004/0008253 | A1 | 1/2004 | Monroe |
| 2004/0029579 | A1 | 2/2004 | Kashiwase |
| 2004/0029615 | A1 | 2/2004 | Gerry et al. |
| 2004/0117611 | A1 | 6/2004 | Huber et al. |
| 2004/0121729 | A1 | 6/2004 | Herndon et al. |
| 2004/0183673 | A1 | 9/2004 | Nageli |
| 2004/0246104 | A1 | 12/2004 | Baechtiger et al. |
| 2005/0038601 | A1 | 2/2005 | Dentinger et al. |
| 2005/0041573 | A1 | 2/2005 | Eom et al. |
| 2005/0060339 | A1 | 3/2005 | McGee |
| 2005/0076034 | A1 | 4/2005 | Addonisio et al. |
| 2005/0143005 | A1 | 6/2005 | Moore, III |
| 2005/0201311 | A1 | 9/2005 | Willey et al. |
| 2005/0201326 | A1 | 9/2005 | Lakkis |
| 2005/0248456 | A1 | 11/2005 | Britton, Jr. et al. |
| 2005/0281319 | A1 | 12/2005 | Schilling |
| 2006/0055561 | A1 | 3/2006 | Kamali et al. |
| 2006/0094450 | A1 | 5/2006 | Park et al. |
| 2006/0140314 | A1 | 6/2006 | Kim et al. |
| 2006/0141930 | A1 | 6/2006 | Keen et al. |
| 2006/0187026 | A1 | 8/2006 | Kochis |
| 2006/0233147 | A1 | 10/2006 | Karabinis |
| 2006/0251107 | A1 | 11/2006 | Geren et al. |
| 2007/0031150 | A1 | 2/2007 | Fisher et al. |
| 2007/0040647 | A1 | 2/2007 | Saenz et al. |
| 2007/0064641 | A1 | 3/2007 | Laroia et al. |
| 2007/0086335 | A1 | 4/2007 | McCanne et al. |
| 2007/0116158 | A1 | 5/2007 | Guo et al. |
| 2007/0117515 | A1 | 5/2007 | Sinibaldi et al. |
| 2007/0130599 | A1 | 6/2007 | Monroe |
| 2007/0202816 | A1 | 8/2007 | Zheng |
| 2007/0223425 | A1 | 9/2007 | Masui et al. |
| 2007/0291826 | A1 | 12/2007 | Hafuka |
| 2007/0293149 | A1 | 12/2007 | Wubker |
| 2007/0298786 | A1 | 12/2007 | Meyers et al. |
| 2008/0030345 | A1 | 2/2008 | Austin et al. |
| 2008/0043653 | A1 | 2/2008 | Lakkis |
| 2008/0181170 | A1 | 7/2008 | Branlund et al. |
| 2009/0042516 | A1 | 2/2009 | Karabinis |
| 2009/0046771 | A1 | 2/2009 | Abe et al. |
| 2009/0135954 | A1 | 5/2009 | Salhov et al. |
| 2009/0175299 | A1 | 7/2009 | Hosokawa et al. |
| 2009/0238246 | A1 | 9/2009 | Dawid et al. |
| 2009/0257517 | A1 | 10/2009 | Nordstrom et al. |
| 2009/0279620 | A1 | 11/2009 | Schenk |
| 2009/0298422 | A1 | 12/2009 | Conroy et al. |
| 2009/0316759 | A1 | 12/2009 | Zeira |
| 2010/0064091 | A1 | 3/2010 | Futenma et al. |
| 2010/0166180 | A1 | 7/2010 | Steer et al. |
| 2010/0322334 | A1 | 12/2010 | Wang et al. |
| 2011/0038261 | A1 | 2/2011 | Carlstrom |

OTHER PUBLICATIONS

Fleeter, Office Action, U.S. Appl. No. 13/422,195, Jul. 16, 2012, 23 pgs.

Morana, Office Action, U.S. Appl. No. 12/585,056, Apr. 19, 2012, 5 pgs.

Smith, Notice of Allowance, U.S. Appl. No. 12/396,447, Jun. 5, 2012, 7 pgs.

Berthet, Synchronization Complexity for a Satellite Multimedia Burst Receiver, NORSIG99, Sep. 9-11, 1999, Asker, Norway, 5 pgs.

Evans, Satellite Communication Systems 3rd edition, Jan. 2009, cover page and p. 468.
Fleeter, Notice of Allowance and Fees Due, U.S. Appl. No. 10/054,175, Aug. 18, 2004, 7 pgs.
Fleeter, Office Action, U.S. Appl. No. 09/130,854, Nov. 22, 2000, 7 pgs.
Franke, Choosing the best hardware form-factor for the airborne domain of the Joint Tactical Terminal (JTT) and Joint Tactical Radio System (JTRS), Aug. 6, 2002, 8 pgs.
Handermann, Notice of Allowance and Fees Due, U.S. Appl. No. 11/685,936, Dec. 1, 2009, 6 pgs.
Handermann, Office Action, U.S. Appl. No. 11/685,936, Sep. 9, 2009, 22 pgs.
Handermann, Office Action, U.S. Appl. No. 11/685,936, Oct. 20, 2008, 16 pgs.
Handermann, Supplemental Notice of Allowability, U.S. Appl. No. 11/685,936, Dec. 15, 2009, 4 pgs.
Harms, The Orbcomm Experience, EMPS 2004, Sep. 2004, 6 pgs.
McDermott, Specification and Drawings, U.S. Appl. No. 11/876,747, Oct. 22, 2007, 28 pgs.
Holm, Why convert to a SAASM-based Global Positioning System?, Military Embedded Systems, Oct. 2005, 3 pgs.
International Search Report and Written Opinion, PCT/US2006/042524, Apr. 22, 2008, 13 pgs.
International Search Report and Written Opinion, PCT/US2006/049656, Feb. 21, 2008, 12 pgs.
International Search Report and Written Opinion, PCT/US2007/063986, Oct. 26, 2007, 12 pgs.
Jordan, Final Office Action, U.S. Appl. No. 11/936,784, Nov. 7, 2011, 16 pgs.
Jordan, Office Action, U.S. Appl. No. 11/936,784, Aug. 27, 2010, 12 pgs.
Larson, Mission Analysis and Design, Chapter 22-Design of Low-Cost Spacecraft, 1992, 2 cover sheets and pp. 767-796.
McDermott, Notice of Allowance and Fees Due, U.S. Appl. No. 11/739,377, Dec. 14, 2011, 7 pgs.
McDermott, Notice of Allowance and Fees Due, U.S. Appl. No. 09/513,962, Sep. 9, 2005, 4 pgs.
McDermott, Notice of Allowance and Fees Due, U.S. Appl. No. 10/208,882, Apr. 10, 2007, 8 pgs.
McDermott, Notice of Allowance and Fees Due, U.S. Appl. No. 11/876,747, Jun. 3, 2009, 7 pgs.
McDermott, Office Action, U.S. Appl. No. 09/513,962, Sep. 14, 2004, 6 pgs.
McDermott, Final Office Action, U.S. Appl. No. 09/513,962, Apr. 16, 2004, 10 pgs.
McDermott, Office Action, U.S. Appl. No. 09/513,962, Jun. 24, 2003, 10 pgs.
McDermott, Final Office Action, U.S. Appl. No. 09/513,962, May 27, 2005, 9 pgs.
McDermott, Office Action, U.S. Appl. No. 11/739,377, Aug. 23, 2011, 17 pgs.
McDermott, Office Action, U.S. Appl. No. 11/876,747, Nov. 28, 2008, 5 pgs.
McDermott, Office Action, U.S. Appl. No. 10/208,882, Jan. 3, 2007, 11 pgs.
Meyers, Notice of Allowance and Fees Due, U.S. Appl. No. 11/592,008, Aug. 26, 2010, 10 pgs.
Meyers, Office Action, U.S. Appl. No. 11/592,008, Feb. 3, 2010, 24 pgs.
Meyers, Office Action, U.S. Appl. No. 11/592,008, Aug. 15, 2008, 18 pgs.
Meyers, Office Action, U.S. Appl. No. 11/592,008, May 18, 2010, 25 pgs.
Meyers, Office Action, U.S. Appl. No. 11/592,008, Mar. 19, 2009, 25 pgs.
Meyers, Office Action, U.S. Appl. No. 11/592,008, Sep. 21, 2009, 24 pgs.
Morana, Notice of Allowance and Fees Due, U.S. Appl. No. 11/618,379, May 13, 2009, 4 pgs.
Morana, Office Action, U.S. Appl. No. 11/618,379, Jan. 6, 2009, 7 pgs.
Morana, Office Action, U.S. Appl. No. 12/585,056, Oct. 13, 2011, 8 pgs.
Morana, Office Action, U.S. Appl. No. 29/270,057, Feb. 26, 2009, 5 pgs.
Ormesher, Current Radar Responsive Tag Development Activities at Sandia National Laboratories, Proc. of SPIE vol. 5410, 2004, 7 pgs.
Skiscim, Notice of Allowance and Fees Due, U.S. Appl. No. 12/101,391, Jul. 22, 2011, 18 pgs.
Skiscim, Office Action, U.S. Appl. No. 12/101,391, Jan. 4, 2011, 14 pgs.
Smith, Office Action, U.S. Appl. No. 12/396,447, Dec. 5, 2011, 31 pgs.
Stafford, Notice of Allowance and Fees Due, U.S. Appl. No. 11/681,759, Aug. 13, 2008, 7 pgs.
Stafford, Notice of Allowance and Fees Due, U.S. Appl. No. 11/937,826, Jul. 29, 2011, 8 pgs.
Stafford, Final Office Action, U.S. Appl. No. 11/681,759, May 20, 2008, 8 pgs.
Stafford, Office Action, U.S. Appl. No. 11/681,759, Dec. 21, 2007, 7 pgs.
Stafford, Office Action, U.S. Appl. No. 11/937,826, Sep. 16, 2010, 5 pgs.
Summers, Plug and play testbed to enable responsive space missions, IEEE paper #1221, Mar. 5-12, 2005, 8 pgs.
Zenick Jr., Notice of Allowance and Issue Fee Due, U.S. Appl. No. 09/045,970, Sep. 24, 2001, 2 pgs.
Zenick Jr., Office Action, U.S. Appl. No. 09/045,970, Apr. 10, 2001, 4 pgs.
Zenick Jr., Office Action, U.S. Appl. No. 09/045,970, Oct. 25, 2001, 3 pgs.
DVB User Guidelines for the Second Generation System for Broadcasting, Interactive Services, News Gathering and Other Broadband Satellite Applications (DVB-S2), ETSI TR 102 376 v.1.1.1 Technical Report, 2005, 104 pgs.
HT PHY Specification, Enhanced Wireless Consortium publication V1.27, Dec. 23, 2005, 67 pgs.
McDermott, Office Action, U.S. Appl. No. 12/890,578, Oct. 26, 2012, 14 pgs.
Morana, Notice of Allowance, U.S. Appl. No. 12/585,056, Nov. 20, 2012, 5 pgs.
Singleton, Office Action, U.S. Appl. No. 11/693,116, Oct. 26, 2012, 9 pgs.
Candell, Office Action, U.S. Appl. No. 12/692,789, Sep. 21, 2012, 10 pgs.
Fleeter, Office Action, U.S. Appl. No. 10/992,173, Oct. 17, 2012, 17 pgs.

* cited by examiner

LOW-COST SATELLITE COMMUNICATION SYSTEM

This application is a divisional of U.S. patent application Ser. No. 10/054,175, filed 22 Jan. 2002 now U.S. Pat. No. 6,856,606, which was a continuation-in-part of U.S. patent application Ser. No. 09/045,970, filed 21 Mar. 1998, and issued as U.S. Pat. No. 6,396,819 on 28 May 2002, the contents of each of which are incorporated by reference herein.

FIELD OF THE INVENTION

This invention relates generally to satellite communication systems, and in particular to a communication system for transmitting short duration messages from low-cost remote terminal units dispersed over a wide geographic area.

BACKGROUND OF THE INVENTION

There is a growing need for receiving information from sources that are dispersed about a wide area. For example, for efficient farming and irrigation, knowledge of soil moisture content at various locations across a field or region is important; for efficient shipping and navigation, knowledge of sea conditions at various locations across an ocean is important. Similarly, there is a growing need for the control of devices that are dispersed about a wide area, such as switches that open or close irrigation flues. There is also a growing need for receiving information about the location of resources that may travel about a wide area. For example, for efficient wildlife or herd management, knowledge of the location of members of the herd is important; for property recovery, the knowledge of the location of a stolen vehicle is important. Such information and control messages are characterized as being of relatively short duration, and/or not necessarily time-critical. The information content of a particular message may also be relatively insignificant, but the aggregate information content from a plurality of remote sensors, such as barometric sensors, may have significance. However, because these control devices and information sources are dispersed over a large area, the communication of these relatively short and somewhat non-critical messages is often cost prohibitive using conventional communication systems. The use of relatively complex devices, such as cellular telephones or pagers, to communicate the messages also make the collection or distribution of these messages cost prohibitive.

Satellites offer the possibility of providing communications to and from remote terminal units over a wide service area, without the infrastructure typically required for ground-based communications systems. Because of the desire to keep the complexity of each satellite to a minimum, satellites also provide the opportunity to provide communication services customized to an anticipated type of information transfer. That is, a satellite communication system optimized for a particular type of message transfer, such as a high-volume of low-priority short-messages, will be significantly less complex, and therefore more inherently reliable and less costly than conventional systems designed for high-priority continuous information transfer.

To communicate via a satellite, the transmitted signal from a ground station must be received at the satellite at a sufficient signal to noise ratio (SNR), and the retransmitted signal from the satellite must be also be received at the intended ground station at a sufficient SNR. The SNR can be increased by increasing the power density of the signal being received, or by reducing the power density of the noise being received. To optimize the received power density, directional antennas are used to narrow the transmission beamwidth, thereby increasing the portion of the transmitted power being received by the receiver by minimizing the dispersion of the transmitted power. Because the transmitted power density within a narrow-beamwidth antenna's beamwidth is increased, as compared to the transmitted power density from an omnidirectional antenna, a narrow-beamwidth antenna is termed a high-gain antenna; a wide-beamwidth antenna is termed a low-gain antenna. Directional, high-gain antennas are used to narrow the receiver beamwidth, to decrease the portion of noise energy being received. Directional high-gain antennas must be aimed so that the intended receiver antenna or transmitter antenna is contained within the narrowed beamwidth. The narrower the beamwidth, the more precise the aiming must be. The area encompassed by an antenna's beamwidth is termed the antenna's field of view.

To minimize the number of satellites needed to provide communications over a wide geographic area, each satellite should have an antenna with a field of view that covers a maximum amount of the satellite's service area. That is, each satellite should have a relatively low-gain wide-beamwidth antenna. To provide a high signal to noise ratio for communications to and from the satellite, the ground station uses a high-gain narrow-beamwidth antenna, to compensate for the satellite's low-gain antenna. Satellites that broadcast television signals, for example, utilize a relatively wide-beamwidth antenna covering their entire service area, and each television receiver requires a high-gain narrow-beamwidth antenna that is aimed at the transmitting satellite.

The requirement to aim a directional high-gain antenna at a satellite is infeasible or impractical for mobile ground terminals, or for satellites that are moving relative to the ground terminal. This requirement also increases the cost of the ground terminals, making their use for relatively infrequent and low-priority messages cost prohibitive. The aforementioned satellite television broadcast system uses geo-stationary satellites, and is intended for fixed reception sites. Geostationary satellites are significantly more expensive to launch and maintain than lower altitude satellites, and, being farther from the earth, require more transmitted power or higher-gain antennas. A typical solution for mobile ground terminals and moving satellites is to use a narrow-beam high-gain antenna at the satellite, and allow wide-beam antennas at the ground terminals. The use of narrow-beam antennas, however, requires a significant increase in the number of satellites needed to provide communications over a large geographic area, because each antenna's field of view is significantly smaller than the satellite's service area, and overlapping satellite service areas are required to provide sufficient fields of view that cover the geographic area. As with ground communications systems, however, providing a significant number of satellites to a sparsely populated geographic area may not be economically feasible, and the cost of providing such a service to an economically disadvantaged region may preclude its use. Furthermore, in populated areas, the profusion of mobile telephony and high speed data transfer communications imposes significantly complex design requirements on all transmitters, such that the cost of using existing systems for the transmission of relatively short bursts of information or control messages is not justified.

SUMMARY OF THE INVENTION

A need exists for a satellite communications system for transmitting information messages of relatively short duration from remote terminal units dispersed over a wide geographic area that utilizes a minimum number of satellites yet allows for the use of a wide-beamwidth antenna at the remote device. There is also a corresponding need for transmitting relative short duration control information to remote terminal units using a minimum number of satellites and a low-gain wide-beamwidth antenna at the remote device. The remote devices should also require minimal power, allowing for their use as portable or mobile devices, and should be of minimal cost and complexity, allowing for their use in a wide variety of multi-point data collection activities.

These needs, and others, are satisfied by providing a communication system that allows the use of low-cost, low-power remote terminal units that communicate substantially asynchronously and independently to a base station. To minimize cost and complexity, the remote terminal units are configured similarly, including the use of substantially identical transmission schemes, such as a common Direct Sequence Spread Spectrum (DSSS) code. To minimize collisions among transmissions, the communication system is designed to use a high-gain antenna with a limited field of view, to limit the number of cotemporaneous, or overlapping transmissions that are received at the base station. To cover a wide area, the limited field of view is swept across the area of coverage. To overcome potential losses caused by collisions, the remote terminal units are configured to repeat transmissions; to minimize repeated collisions, the repeat interval and/or duration is randomized.

DETAILED DESCRIPTION OF THE INVENTION

Figure 1:
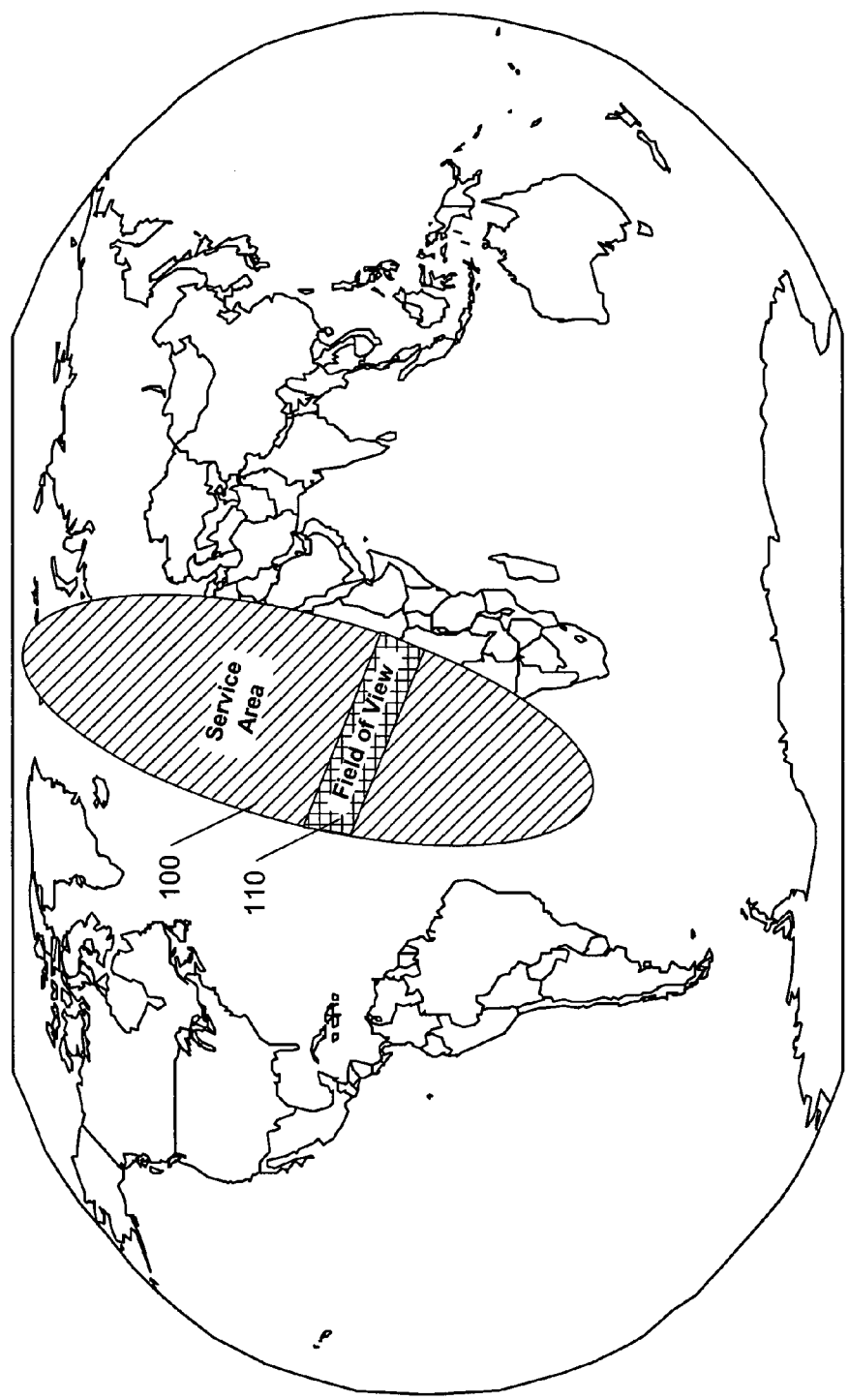
FIG. 1 illustrates a satellite service area and a field of view of a high gain antenna in accordance with an aspect of this invention.

In general, the satellite communications system of this invention provides high-gain coverage to a wide geographic area with a minimum number of satellites, and allows for the use of inexpensive remote terminal units for communicating with the satellite. A satellite in accordance with this invention includes a high-gain antenna that periodically sweeps the satellite's service area to receive the messages from remote terminal units within the entire service area. In a preferred embodiment, a satellite may contain multiple high-gain antennas, each antenna sweeping a portion of the entire service area. For ease of understanding, the invention is presented herein using the paradigm of a satellite that has a single high-gain antenna. Because the high-gain antenna sweeps the satellite's entire service area, there is no need to deploy multiple satellites with overlapping service areas. In order to provide high gain, the antenna is designed to have a narrow beamwidth in at least one dimension. To cover the entire area, the antenna's field of view is swept across the entire service area. In the preferred embodiment, the antenna's field of view is essentially rectilinear, having a narrow beamwidth in one dimension and a beamwidth that extends across the entire service area in the other dimension, such that the sweeping effect is akin to that of a common push-broom. Because of the high gain of the satellite antenna, communications via the satellite can be accomplished using low power and/or using a low-gain wide-beamwidth antenna at the remote terminal unit. The system is optimized for the use of remote terminal units that transmit short duration messages relatively infrequently. To provide cost-effectiveness, the preferred remote terminal units have minimal capabilities, having for example a fixed transmit frequency or a fixed modulation scheme. Because the messages are infrequent and short, the same communication channel may be shared among multiple remote terminal units, allowing for the mass production of virtually identical low-cost, single-purpose transmitters.

For convenience in terminology, the satellite communications system will be described herein as including remote terminal units (RTUs) and a ground station. The RTUs are the satellite communication devices that operate at low power and/or with low-gain antennas. The remote terminal units may include a transmitter, a receiver, or both. The RTU transmitter is constrained to be low powered, either to allow for sustained portable operation, or because of regulatory constraints, such as FCC limits. Although one ground station is used in the examples herein, the principles presented can be readily applied to multiple ground stations. The ground station may operate at high power and/or with a high-gain antenna and satellite tracking capability. However, as would be evident to one of ordinary skill in the art, the ground station may also operate at low power and/or with a low-gain antenna, and may in fact be similar in structure and design as the remote terminal units. Similarly, some remote terminal units may be located at sites providing virtually unlimited power, and/or at fixed sites that allows for the use of a higher-gain antenna.

FIG. 1 shows a map of the earth with a satellite service area 100 overlaid upon a portion of the earth's surface. The service area 100 is the area on the earth's surface to and from which effective communications with the satellite can be maintained. The service area 100 of a satellite is determined primarily by the satellite's altitude above the earth, and the minimum elevation angle from the earth to the satellite for effective communications. Although a satellite's service area 100 may theoretically extend to an entire hemisphere, communications to and from regions on the fringe of the theoretical extent exhibit a significant amount of ground based interference, because signals travelling at a low elevation angle must traverse a longer distance over the earth's surface. In general, an elevation angle of at least 30 degrees is preferred. For a "low-earth" (LEO) satellite, the service area 100 is about +/−30 degrees longitude and latitude. As the satellite moves relative to the earth's surface, the satellite's service area moves as well.

FIG. 1 also shows a field of view 110 representative of an embodiment of a high gain antenna in accordance with this invention. As shown, the field of view 110 is substantially smaller than the satellite's service area. The size of the field of view 110 and the antenna gain are directly related. An antenna having a gain of ten over an antenna that encompasses the entire service area 100 will have a field of view 110 of one-tenth the area of the service area 100. In the preferred embodiment, the antenna's field of view 110 is essentially rectilinear and extends across the service area 100 in one dimension, although other configurations would be evident to one of ordinary skill in the art.

Figure 2:
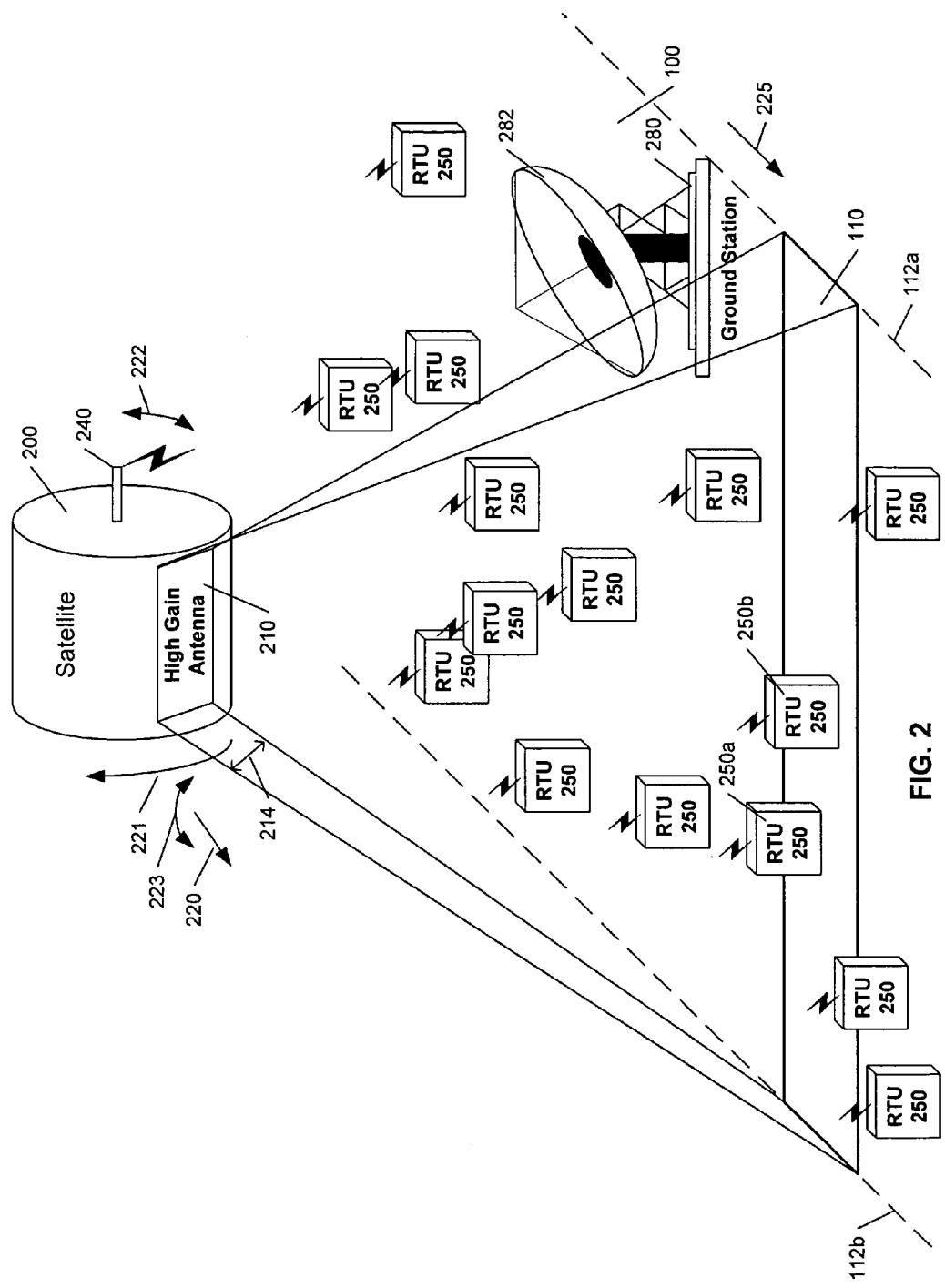
FIG. 2 illustrates an embodiment of a satellite communications system in accordance with an aspect of this invention.

FIG. 2 shows an illustration of a satellite 200 having a high-gain antenna 210 that has a field of view 110 within the satellite's service area 100. The dashed lines 112a and 112b indicate the bounds of the service area 100, formed by the sweeping of the field of view in the direction indicated by the arrow 225. The field of view 110 can be made to sweep the service area 100 in a variety of manners. The preferred embodiment uses satellites that travel in an orbital plane. As the satellite 200 traverses the sky above the service area 100 in the direction indicated by the arrow 220, the field of view 110 will traverse the path 112a-b. Additionally, to sweep the service area more often than once per orbital period, the satellite 200 and antenna 210 may be rotating, as shown by arrow 221, or rocking back and forth, as shown by arrows 222 and 223. Other means of having the field of view 110 sweep the service area 100 would be evident to one of ordinary skill in the art. The high-gain antenna 210 can be fixedly mounted to the satellite 200, or movably mounted; for ease of discussion, a movement of the satellite 200 implies a corresponding movement of the field of view 110 of the antenna 210, although an independent movement of the antenna 210 may be used to effect the same result. For example, the antenna 210 can be mounted as a pendulum, thereby providing the rocking motions 222 and 223 with minimal energy demands to sustain the motion. Each of the means of sweeping the service area 100 can be used independently or in conjunction with each other to effect the sweep. For example, the satellite could be travelling in direction 220 and rotating 221 at the same time. If the service area 100 is both wider and longer than the field of view, the field of view 110 may be swept across the service area in two dimensions, for example by travelling in direction 220 while rocking about an axis coincident with the direction of travel 220, as shown by arrow 223.

Also shown in FIG. 2 are a plurality of remote terminal units RTU 250, and a ground station 280. The RTUs 250a and 250b are shown to be within the field of view 110 of the high gain antenna 210, whereas the other RTUs 250 are outside the field of view 110. The RTUs 250a and 250b are the only RTUs 250 that are able to communicate with the satellite 200 via the antenna 210, because of the antenna's narrow beamwidth 214. Because the antenna's beamwidth is narrow, its gain is high, thereby allowing the use of a low powered transmitter and low gain antenna at the RTUs 250a and 250b within its field of view 110. The required gain of the antenna 210 is determined based upon the transmitted power of the RTUs 250a-b, the distance of the satellite 200 from the RTUs 250a-b, the gain, if any, of the antennas at the RTUs, and the predicted noise level, using conventional "link-margin" calculations common to one of ordinary skill in the art. The required gain of the antenna 210 thereafter determines the total beamwidth of the antenna 210, from which the beamwidths in each dimension can be chosen. In a typical configuration, the RTUs 250 are limited to be one-watt transmitters with omidirectional or hemispherical antenna patterns, with a gain of 0 to 5 dBi, where dBi is the gain relative to an isotropic antenna. To receive the signal with a sufficient SNR at a satellite receiver located 2500 km above the earth, the antenna gain should be at least 14 dBi. An antenna having a total beamwidth of 10 degrees by 90 degrees will provide a gain of approximately 14 dBi. This link margin analysis is based on a 1200 baud signal at a worse case slant range at 10 degrees of elevation, and a corresponding transmitter to satellite distance of 8152 km. As would be evident to one of ordinary skill in the art, increasing or decreasing the transmission data rate will correspondingly increase or decrease the required gain.

By sweeping the service area 100 with the field of view 110 of the high-gain antenna 210, each of the RTUs 250 will be within the field of view 110 at some time, and will thus be able to transmit to the satellite using a low powered transmitter and a low gain antenna. In a similar manner, whenever an RTU 250 is within the field of view 110 of the high-gain antenna 210, it will be able to receive communications from the satellite 200 using a low gain antenna. To provide at least a 2:1 gain at the high-gain antenna 210 compared to an antenna having a field of view equal to the satellite service area 100, the field of view 110 should be less than half the service area 100. As the field of view 110 is reduced relative to the service area, the transmit power and antenna gain requirements at the RTU 250 decrease.

The ground station 280 is shown having a directional high-gain antenna 282. Because the ground station uses a high-gain antenna 282, the satellite is able to use a wide-beamwidth low-gain antenna 240 for communications with the ground station 280. By using a wide-beamwidth antenna 240 for communicating with the ground station 280, the ground station 280 can communicate with the satellite independent of the field of view 210 of the high-gain antenna 210. That is, the ground station 280 can be anywhere within the field of view of the wide-beamwidth antenna 240. As in a conventional satellite system, the satellite is designed with minimal transmit power requirements. Link-margin calculations determine the required gain of the ground station antenna 282 to allow for the minimal satellite requirements, balanced against the cost of providing the accurate satellite tracking required for a high-gain antenna. Alternatively, if the satellite 200 uses the same high-gain antenna 210 to communicate with the ground station 280, the ground station 280 need not use a high-gain antenna that requires satellite tracking. U.S. Pat. No. 6,128,469 "Satellite Communication System with a Sweeping High-Gain Antenna, issued 3 Oct. 2000, to Raymond G. Zenick Jr., John Eric Hanson, Scott A. McDermott, and Richard D. Fleeter is incorporated by reference herein. Disclosed in this referenced patent are a variety of configurations for effecting the above communication scheme. Of particular note, the satellite 200 may be configured with a plurality of antennas that are electronically switched to effect a sweeping pattern. In such an embodiment, the order of selection of the antenna can be arbitrary. For the purpose of this invention, the term sweep is interpreted to include any time-sequential scanning, or 'illumination', of smaller areas 110 within the coverage area 100. In like manner, the term antenna is interpreted to include a single antenna, as well as any currently active antenna, or plurality of antenna elements, among a plurality of antennas.

Figure 3:
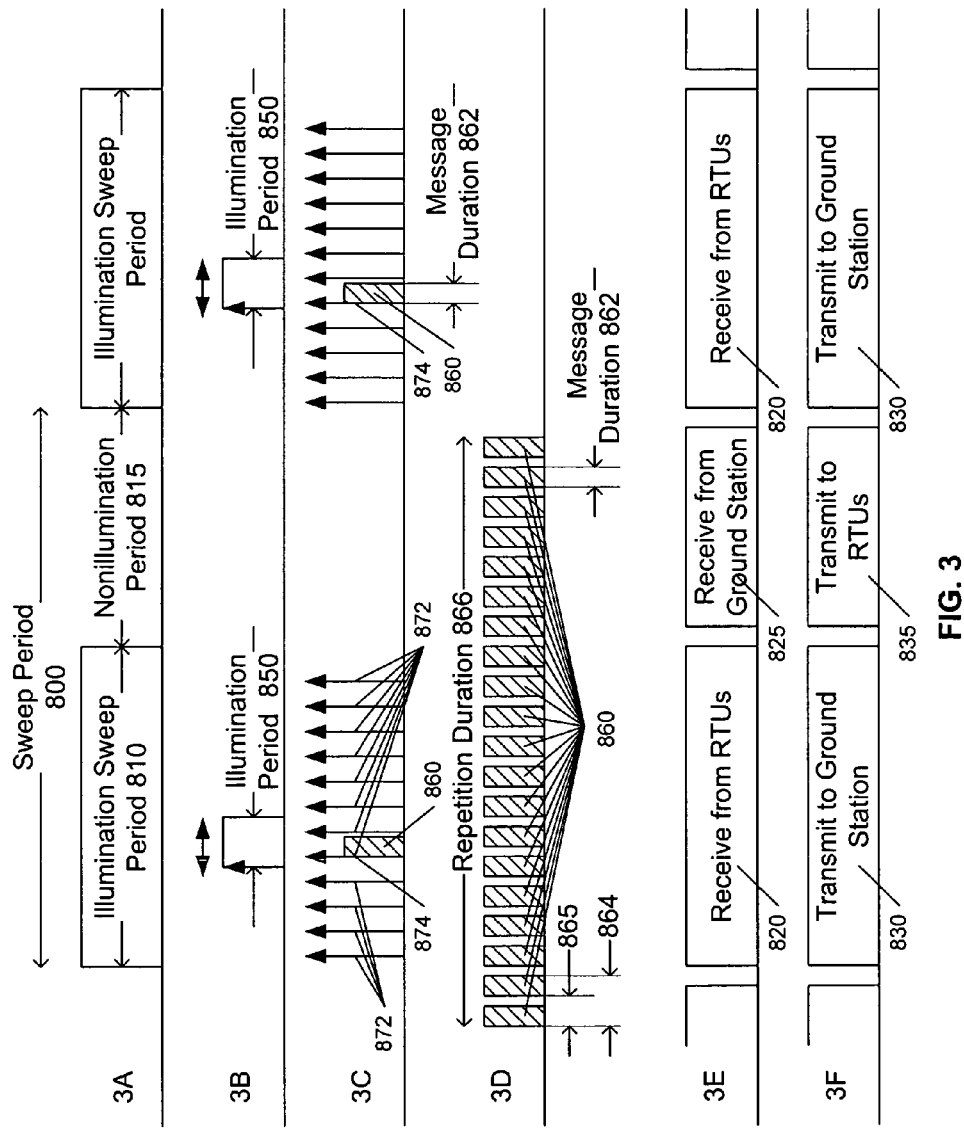
FIG. 3 illustrates a timing diagram of a satellite communications system in accordance with an aspect of this invention.

FIG. 3 shows the timing relationships introduced by the sweeping of a service area 100 by a high gain antenna 210. The time during which an RTU 250 is within the field of view 110 of the high-gain antenna 210 is termed the illumination period 850. The overall time during which the high-gain antenna 210 is sweeping the service area 100 is the illumination sweep period 810. The time duration between the start of each sweep is the sweep period 800, and the difference between the sweep period 800 and the illumination sweep period 810 is the nonillumination period 815.

Each RTU 250 has an illumination period 850 that is substantially less than the sweep period 800, and in particular, substantially less than the illumination sweep period 810. The ratio of an RTU's illumination period 850 and the illumination sweep period 810 is dependent upon the gain of the high-gain antenna 210, and, correspondingly, the size of the field of view 110 relative to the service area 100. As discussed above, the field of view 110 should be less than half the size of the service area 100. In a typical embodiment, the field of view 110 is less than a fifth of the service area 100, and thus, an RTU's illumination period 850 will be less than a fifth of the illumination sweep period 810. This provides a 5:1 improvement in antenna gain, compared to an antenna having a field of view equal to the service area 100. The location of the RTU illumination period 850 relative to the illumination sweep period is dependent upon the particular RTU's 250 location within the service area 100, relative to the sweep 225 of the field of view 110 of the high-gain antenna 210.

Figure 4:
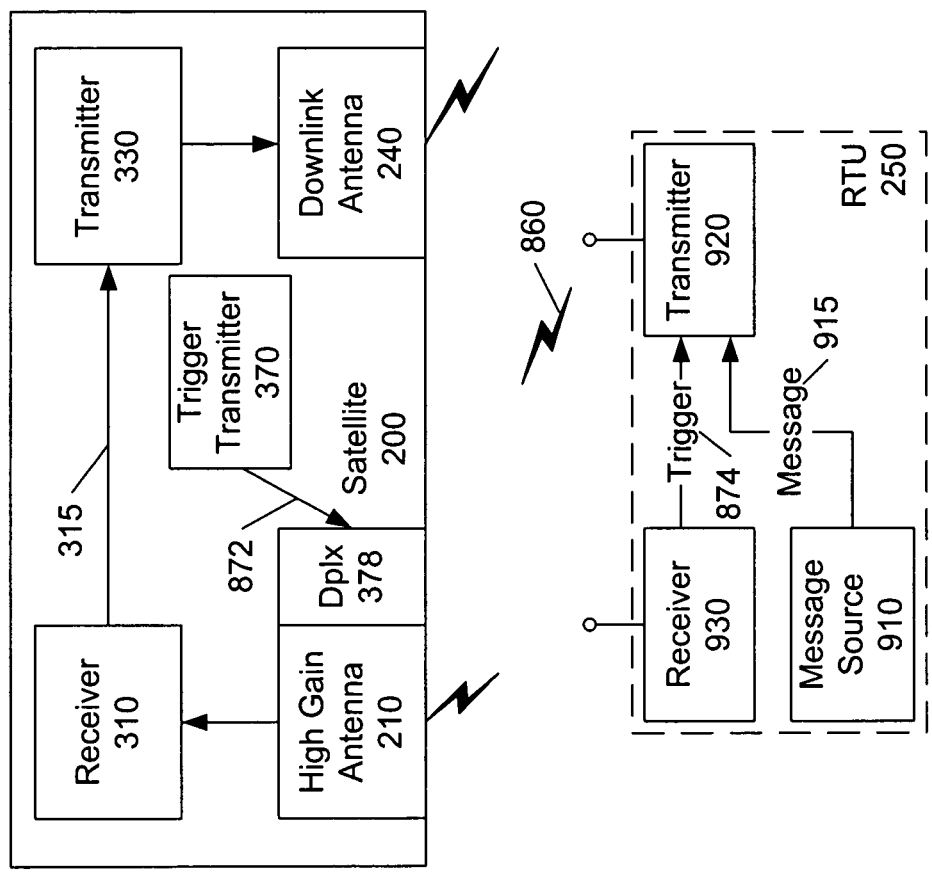
FIG. 4 illustrates a block diagram of an embodiment of a remote terminal unit and satellite communications system in accordance with an aspect of this invention.

Because an RTU 250 is not continually within the field of view 110 of the high-gain antenna 210, each RTU 250 must be designed so as to assure that the intended message is transmitted when the RTU 250 is illuminated 850 by the high gain antenna 210. FIG. 4 illustrates an embodiment of an RTU 250 that responds to trigger signals 872 transmitted from the satellite 200. The RTU 250 includes a message source 910, a receiver 930, and a transmitter 920. The message source 910 may be a transducer that is measuring some parameter, such as soil moisture content, or any other device that generates an information message 915 intended to be transmitted. Upon receiving a trigger signal 872, the receiver 930 issues a trigger pulse 874 to the transmitter 920. Upon receiving a trigger pulse 874 from the receiver 930, the transmitter receives the information message 915 from the message source 910, and transmits a corresponding transmission message 860. The satellite receiver 310 receives the transmission message 860 via the high gain antenna 210. In order for this system to operate properly, the transmission message 860 must be transmitted when the RTU 250 is within the field of view 110 of the high-gain antenna 210. As shown in FIG. 4, the satellite 200 includes a trigger transmitter 370 that transmits trigger signals 872 via the high-gain antenna 210. The antenna diplexor 378 decouples the receiver 310 from the high-gain antenna 210 during the brief periods of transmission of the trigger signals 872. Example trigger signals 872 are shown on line 3C of FIG. 3. Because these trigger signals 872 are transmitted via the high-gain antenna 210, the RTU 250 of FIG. 5 will not receive the trigger signals 872 until the RTU 250 is within the field of view 110, shown by the illumination period 850 in FIG. 3. The receiver 930 of the RTU 250 will produce the trigger pulse 874 corresponding to the first trigger signal 872 that occurs within the illumination period 850. As shown on line 3C, in response to this trigger pulse, the transmitter 920 transmits the transmission message 860 immediately after the first trigger signal 872 that occurs within the illumination period 850. Because the generation of the trigger pulse 874 cannot occur until the RTU 250 is within the field of view 110 of the high-gain antenna 210, and the transmission occurs immediately thereafter, the transmission message 860 will be received via the high-gain antenna 210. Note, however that the duration 862 of the transmission message 860 cannot exceed the illumination period, else the trailing end of the transmission message 860 will occur when the RTU 250 is no longer within the field of view 110 of the high-gain antenna 210. Also, because the trigger signal 872 is asynchronous with the illumination period of each particular RTU 250, the sum of the period of the trigger signals 872 and the message duration 862 must be less than the illumination period 850 in order to assure that the transmission message 860 is completed before the end of the illumination period 850.

To support the transmission of relatively long information messages, the transmitter 910 can be configured to partition the information message 915 into partial information messages, and transmit each of the partial information messages as a transmission message 860 having a message duration 862 that conforms to the above constraint. Also, the transmission of messages from an RTU 250 can be further optimized by checking each information message 915 with its immediately prior information message, and only transmitting a transmission message 860 when the there is a difference from one message to the next.

Note that the RTU 250 of FIG. 4 includes a receiver 930, and the satellite 200 includes a trigger transmitter 370 and diplexor 378. In addition to the additional cost introduced by these components, a failure in either of these components will preclude communications from the RTU 250, and a failure of the trigger transmitter 370 or diplexor 378 will preclude communications to the satellite 200 from all RTUs 250. The preferred embodiment of FIG. 5 shows an RTU 250 for use with a satellite 200 as shown in FIG. 3; that is, the preferred embodiment does not require the use of a trigger signal to effect communications.

Figure 5:
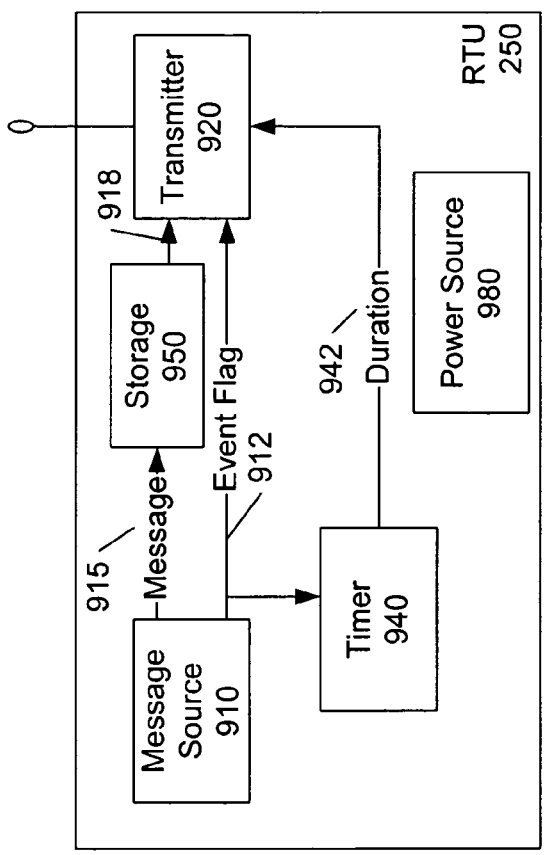
FIG. 5 illustrates a block diagram of the preferred embodiment of a remote terminal unit in accordance with an aspect of this invention.

In FIG. 5, the RTU 250 includes a message source 910, a storage element 950, a timer 940, and a transmitter 920. The message 915 from the message source 910 is stored in the storage element 950; this message is accessible as required by the transmitter 920 via 918. The message source 910 also generates an event flag 912. The event flag 912, for example, may be a flag that is asserted whenever consecutive measurements of a parameter differ by a specified amount, or whenever a parameter exceeds a particular value. The event flag 912 initiates the transmission of a transmission message 860 corresponding to the message 915 that is stored in storage element 950. The event flag 912 also activates the timer 940. The timer 940 is an interval timer that asserts a duration signal 942 coupled to the transmitter 920. In accordance with the preferred embodiment of this invention, the transmitter 920 repeatedly transmits the transmission message 860 corresponding to the stored message 915 while the duration signal 942 is asserted. Because the operation of the RTU 250 of FIG. 5 is independent of a trigger or synchronization signal from the satellite 200, the duration signal 942 must be asserted for a repetition duration 866 that will encompass the illumination period 850, as shown at line 3D of FIG. 3. In the embodiment depicted at line 3D, the repetition duration 866 exceeds the sweep period 800, thereby assuring that at least one illumination period 850 is included in the repetition duration 866. Also, the time duration 864 between the start of one transmission message 860 and the end of the next transmission message 860 is less than the illumination period 850, thereby assuring that at least one full transmission message 860 is contained within the illumination period 850. Thus, by providing for a store-and-retransmit capability at the RTU 250, the RTU 250 reliably and effectively communicates via a satellite 200 without requiring synchronization or coordination means between the RTU 250 and the satellite 200. In the preferred embodiment, the repetition duration 866 is kept to near minimum, to reduce power consumption by the RTU 250. The minimum repetition duration 866 is slightly less than the sweep period 800; in the preferred embodiment, the repetition duration 866 is between one and two sweep periods 800, to provide a sufficient margin of error. Also preferably, to reduce the likelihood of repeated collisions among transmitters, the repeat interval 865 and/or the repeat duration 866 are varied, preferably via a random process. For the purposes of this application, the term "random" includes any process wherein the use of the same interval or duration for a series of repeated transmissions during a common time period by two RTUs 250 is highly unlikely. For example, each RTU 250 may include a free-running counter, and the repeat duration 866 and/or interval 865 is based on the value of one or more bits of the counter when the transmission commences. Alternatively, to reduce power requirements, each RTU 250 may contain a static parameter, such as an identifier, or source address, of the particular RTU 250, and the repeat duration 866 and/or interval 865 is based on one or more bits of this static parameter. Other techniques for providing differing durations 866 and/or intervals 865 in some or all of the RTUs 250 will be evident to one of ordinary skill in the art in view of this disclosure.

Also shown in FIG. 5 is a power source 980. The power source 980 may be a conventional portable or fixed power supply, such as a battery or AC supply. Solar cells and other forms of power sources may be used as well. For example, in the triggered embodiment shown in FIG. 4, the receiver 930 can be a passive resonant circuit that is excited by the trigger signal 872 from the high-gain antenna 210. The energy induced into the resonant circuit by the transmitted trigger signal 872 can be used to subsequently activate and power the transmitter 920, similar to the concept used to induce the transmission of information from passive devices such as ID cards that are read from a distance.

Figure 6:
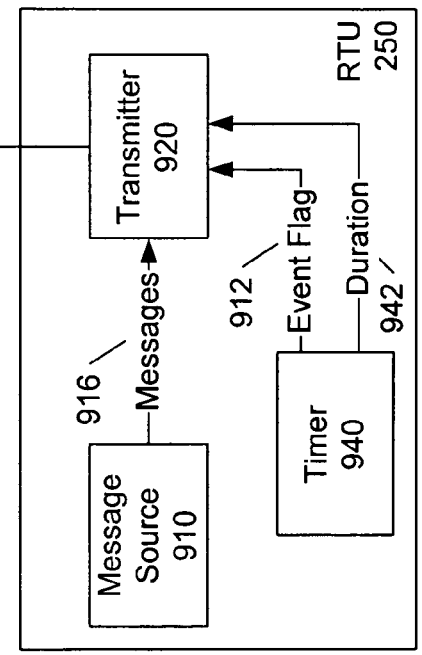
FIG. 6 illustrates a block diagram of another embodiment of a remote terminal unit in accordance with an aspect of this invention.

Other embodiments of an RTU 250 consistent with this invention will be evident to one of ordinary skill in the art. For example, FIG. 6 shows an alternative embodiment that uses the principles presented in the preferred embodiment of FIG. 5. In FIG. 6, the timer 940 generates both the duration signal 942, as well as the event flag 912. Such an embodiment would be used, for example, to generate periodic messages, rather than messages based on the source of the message. The message source 910 may be, for example, a Global Positioning System (GPS) receiver that generates the RTU's 250 global location coordinates. The timer 940 may generate an event flag every hour, thereby providing an hourly report of the RTU's 250 location, for the tracking of mobile RTUs 250, such as livestock or vehicles. Also, absent from FIG. 6 is a storage element 950. In this example embodiment, the transmitter 920 receives continual messages 916 from the message source 910, for example, continual coordinate locations, or continual soil moisture readings. Each of the "repeated" transmission messages 860 may contain different information, corresponding to the continual messages. In general, the differences among the transmission messages 860 are expected to be slight, such that the receipt of any one of the transmission messages 860 is sufficient to convey the desired periodic information.

Figure 7:
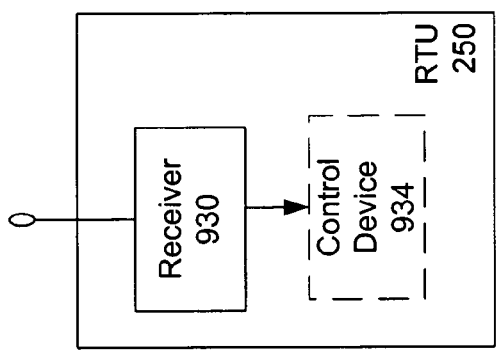
FIG. 7 illustrates a block diagram of an embodiment of a receive-only remote terminal unit in accordance with an aspect of this invention.
Figure 8:
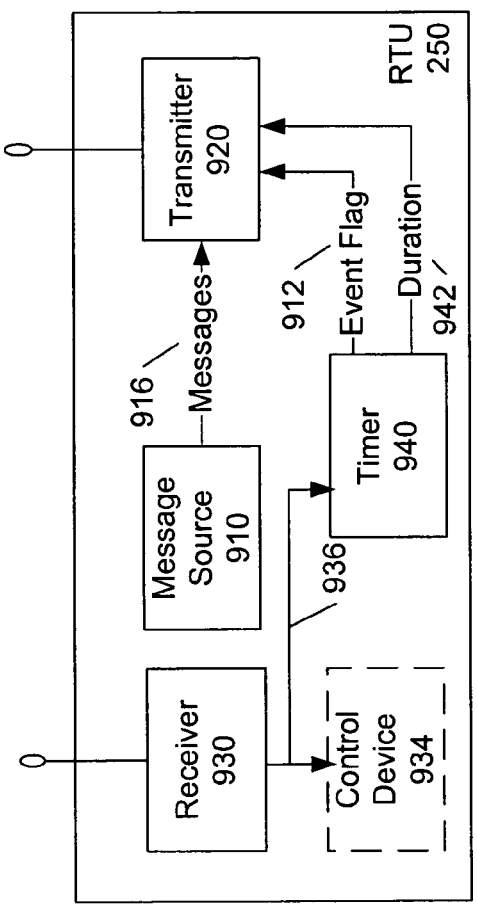
FIG. 8 illustrates a block diagram of an embodiment of a receive-transmit remote terminal unit in accordance with an aspect of this invention.

FIG. 7 shows an RTU 250 that includes a receiver 930 and an optional control device 934. The receiver 930 may be used to receive, for example, text or paging messages at a remote location. The optional control device 934 may be coupled to the receiver 930 for receiving control messages, for example to control a switch or a valve, or to sound an alarm. FIG. 8 is a composite of FIGS. 6 and 7, wherein the receiver 930 is operably coupled to the timer 940 that controls the transmitter 920. In this example embodiment, the duration signal 942 is asserted until a confirmation 936 is received that the information message 915 has been received at the satellite 200 or ground station 180.

Figure 9:
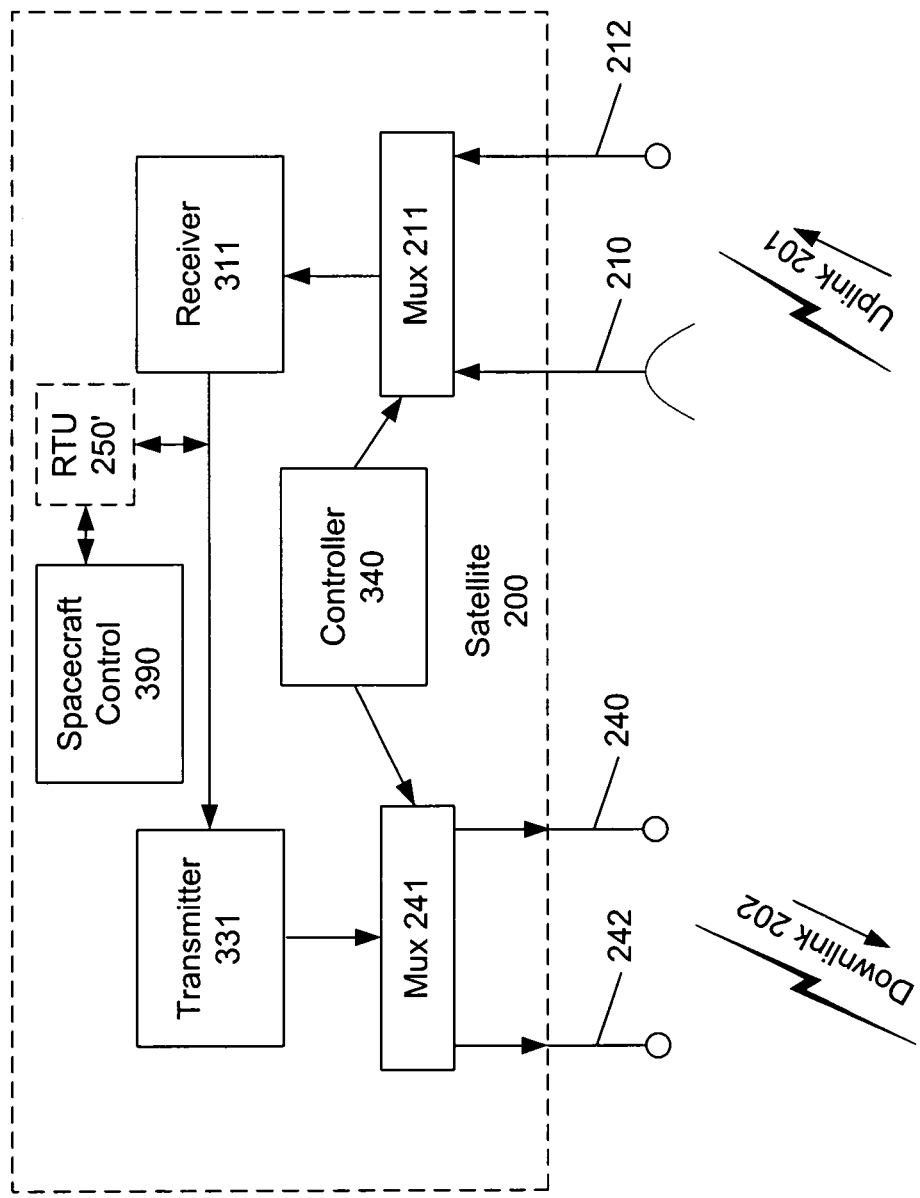
FIG. 9 illustrates a block diagram of an embodiment of a multiplexed satellite in accordance with an aspect of this invention.

FIG. 9 illustrates an example block diagram of a satellite 200 that is configured to use common equipment for both the uplink 201 and downlink 202 communications to and from the satellite 200. In this configuration, independence between uplink 201 and downlink 202 communications is maintained via a time-sharing of the equipment, rather than the use of duplicate equipment. At one time interval, as determined by a controller 340 and multiplex switch 211, the receiver 311 receives communications from the RTUs 250 via the high gain antenna 210, and at another time interval, it receives communications from the ground station 280 via the uplink antenna 212. Similarly, the downlink antenna 240 and the wide-beamwidth antenna 242 are time-division multiplexed 241 at the output of a common transmitter 331. As would be evident to one of ordinary skill in the art, if the antennas 240 and 242 have similar gain requirements, the switch 241 and either one of the antennas 240 or 242 can be eliminated.

FIG. 3 shows an example of timing diagrams corresponding to the multiplexed embodiment of a satellite communication system shown in FIG. 8, at lines 3E and 3F. During the illumination sweep period 810, the receiver 311 is enabled 820 to receive communications from the RTUs 250; during the nonillumination period 815, the receiver 311 is enabled 825 to receive communications from the ground station 280. In this manner, the same receiver 311 is used to perform the function of the receivers 310 and 312, and the same frequency can be used for all uplink communications to the satellite. Similarly, the transmitter 331 is enabled 830 during the illumination sweep period 810 to transmit to the ground station 280, and the transmitter 331 is enabled 835 during the nonillumination period 815 to transmit to the RTUs 250, thereby allowing one transmitter and one frequency to be used for all downlink communications from the satellite.

In the preferred embodiments, the satellite 200 and RTUs 250 will be of minimal complexity, thus maximizing the satellite's reliability, and minimizing the RTUs 250 costs. The satellite 200 receives a radio frequency (RF) bandwidth of information at one frequency, and retransmits the same RF information bandwidth to the ground station 280 at a second frequency. All demodulation and decoding is preferably performed at the ground station 280. Similarly, all messages being sent to the RTUs 250 are encoded and modulated at the ground station 280 and transmitted to the satellite 200 at one frequency and retransmitted to the RTUs 250 at another frequency. As discussed with regard to lines 3E and 3F of FIG. 3, by multiplexing the function of the uplink receiver 311 and downlink transmitter 331, the bandwidth about one frequency, the uplink center frequency, can be used by either the RTUs 250 or the ground station 280 for transmission to the satellite 200, and the bandwidth about another frequency, the downlink center frequency, can be used by the satellite 200 to transmit to either the RTUs 250 or the ground station 280. For ease of discussion, this single uplink frequency and single downlink frequency model will be used hereinafter.

As a further cost reduction measure, the satellite 200 of FIG. 9 is illustrated as containing an RTU 250' that is coupled to the spacecraft control system of the satellite 200. Conventionally, the spacecraft command and control communications are provided by a communications path to the ground station 280 that is independent of the payload communications (receiver 311 and transmitter 331). By placing an RTU 250' within the spacecraft, and configuring the ground station 280 and satellite 200 to communicate the required command and control information using the principles presented herein for communicating to and from an RTU 250 in accordance with this invention, a separate spacecraft communications path is not required. The RTU 250' differs from the typical RTUs 250 of this invention only in the means of receiving and transmitting the communications. The typical RTU 250 uses one or more antennas for remotely communicating with the transmitter 331 or receiver 311, whereas the RTU 250' is coupled directly to the transmitter 331 and receiver 311, using techniques common in the art. For example, with reference to FIG. 8, the input of the receiver 930 of the RTU 250' is coupled to the output of the receiver 311 via a high-impedance isolation device, and the output of the transmitter 920 of the RTU 250' is coupled to the input of the transmitter 331 via a common adder circuit.

The bandwidth allocated for communicating the messages from the RTUs 250 to the ground station 280 must be sufficient to accommodate some maximum number of RTUs 250 communicating to the ground station 280 at the same time. This bandwidth is common to both the uplink and downlink paths to the satellite 200. Each RTU 250, however, does not require the entire bandwidth. The RTUs 250 can use any number of transmission modulation schemes to utilize the available bandwidth.

Figure 10:
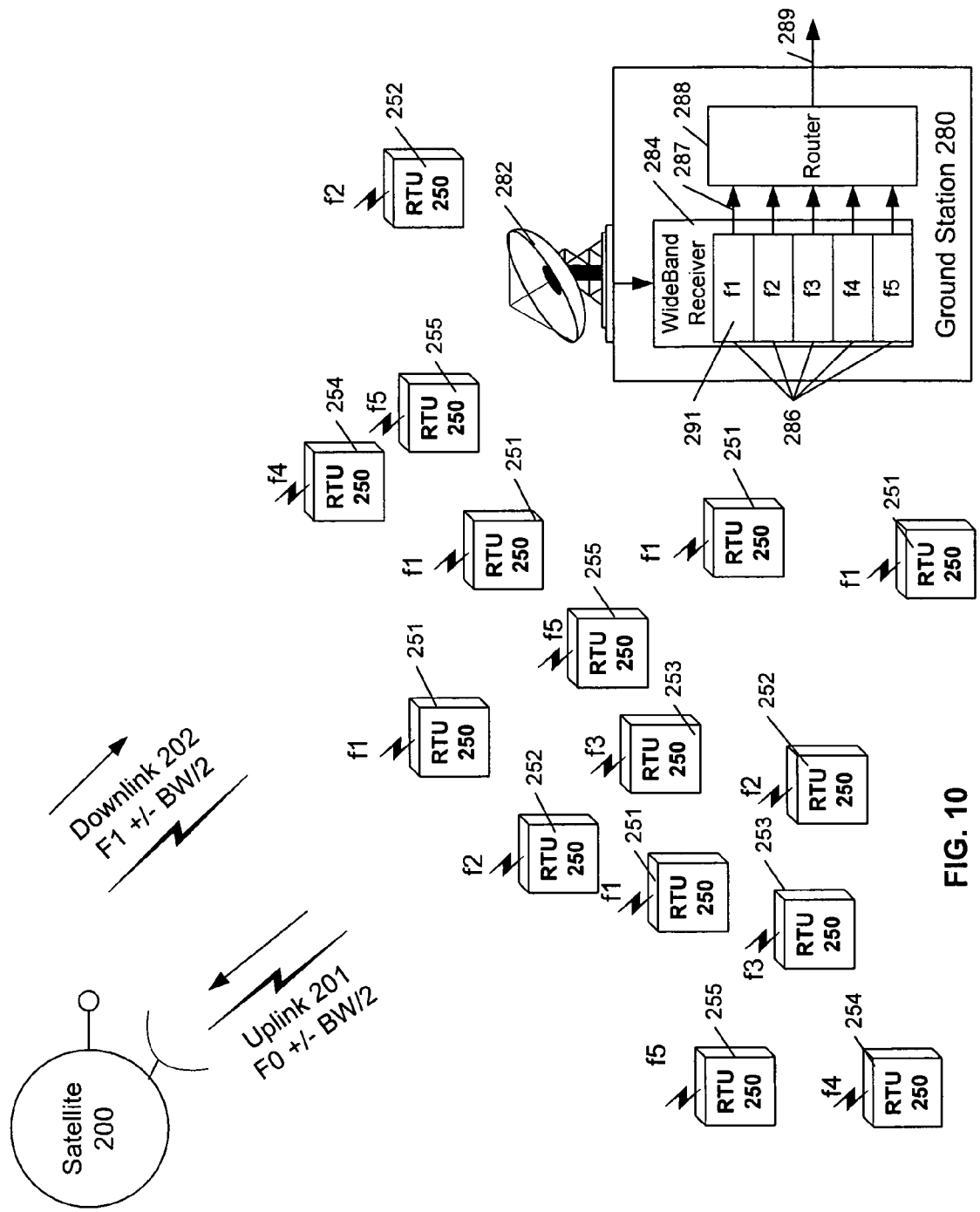
FIG. 10 illustrates a block diagram of an embodiment of a satellite communication system that uses FDM in accordance with an aspect of this invention.

FIG. 10 shows an embodiment of a satellite communications system that utilizes a frequency division allocation, or multiplexing (FDM), of the available bandwidth BW. The satellite 200 transforms an uplink signal 201, which is the RF information bandwidth centered about a frequency F0, into a downlink signal 202 that is the same RF information bandwidth centered about a different frequency F1. Shown in FIG. 10 is the use of five different frequencies f1, f2, ... f5 for communication from the RTUs 250 to the ground station 280 via the satellite 200. Each of the frequencies f1, f2, ... f5 lie within the RF information bandwidth BW centered about a frequency F0, that is, within the uplink signal 201. Each RTU 250 is allocated one of the five transmission frequencies. Those allocated to frequency f1 are identified as RTUs 251; those allocated to frequency f2 as 252; frequency f3 as 253; frequency f4 as 254; and frequency f5 as 255. The ground station 280 includes a wideband receiver 284, capable of receiving the downlink signal 202, which is the RF information bandwidth BW centered about F1, from the satellite 200. The wideband receiver 284 includes receiver components 286 that segregate the received bandwidth BW into segments corresponding to transmission frequencies f1, f2, ... f5. The receiver components 286 produce forwarding messages 287 that are processed by a router 288 and forwarded as destination messages 289, as will be discussed below.

In the embodiment of FIG. 10, each of the RTUs 251 transmits at frequency f1; these transmissions will be detected at 291, the receiver component 286 corresponding to frequency f1. If more than one RTU 251 transmits a transmission message that is received at the satellite 200 at the same time, the detected transmission at 291 will be, in general, a distorted combination of the received transmissions from each of the RTUs 251, and will be unusable. As noted above, however, the satellite communication system in accordance with this invention is preferably used for the communication of relatively short duration and infrequent information messages. Therefore, the likelihood of two RTUs 251 transmitting an information message at the same time is relatively low. Furthermore, the field of view 110 of the high-gain antenna 210 that is used to receive the transmission messages from the RTUs 251 is substantially smaller (at least half) the satellite service area 100. Therefore, assuming a somewhat random distribution of RTUs 251, the transmissions of at least half the RTUs 251 within the service area 100 will not be received by the satellite 200 at any given time, thereby reducing the likelihood of the reception of overlapping signals from more than one RTU 251 at the same time. This same assessment of the likelihood of overlapping receptions by the satellite 200 can be applied to transmissions from RTUs 252, 253, 254, and 255. As the bandwidth BW is increased, the number of transmission frequencies f1, f2, ... fn allocated among the RTUs 250 can be increased, thus further reducing the likelihood of a collision, i.e. the reception of overlapping transmissions from more than one RTU 250 operating at the same frequency. As noted above, the preferred embodiment of the invention is intended for relatively low-priority messages, such that the loss of a message due to a collision is not catastrophic. As would be evident to one of ordinary skill in the art, however, if a particular RTU 250 is required to be collision free, the frequency assigned to that particular RTU 250 can be restricted, such that no other RTU 250 within the field of view 110 of the high-gain antenna 210 of the satellite 200 is allocated that same frequency. Similarly, unique frequencies may be assigned for transmissions to RTUs 250 that contain a receiver 930, so that the transmission of messages from other RTUs 250 in the vicinity of receiver 930 will not interfere with the reception of messages from the ground station 280. Preferably, for example, if an RTU 250' is used in the spacecraft for command and control, as illustrated in FIG. 9, this RTU 250' will be allocated a transmit and receive frequency that differs from all other RTUs 250, to assure collision-free communications.

Figure 11:
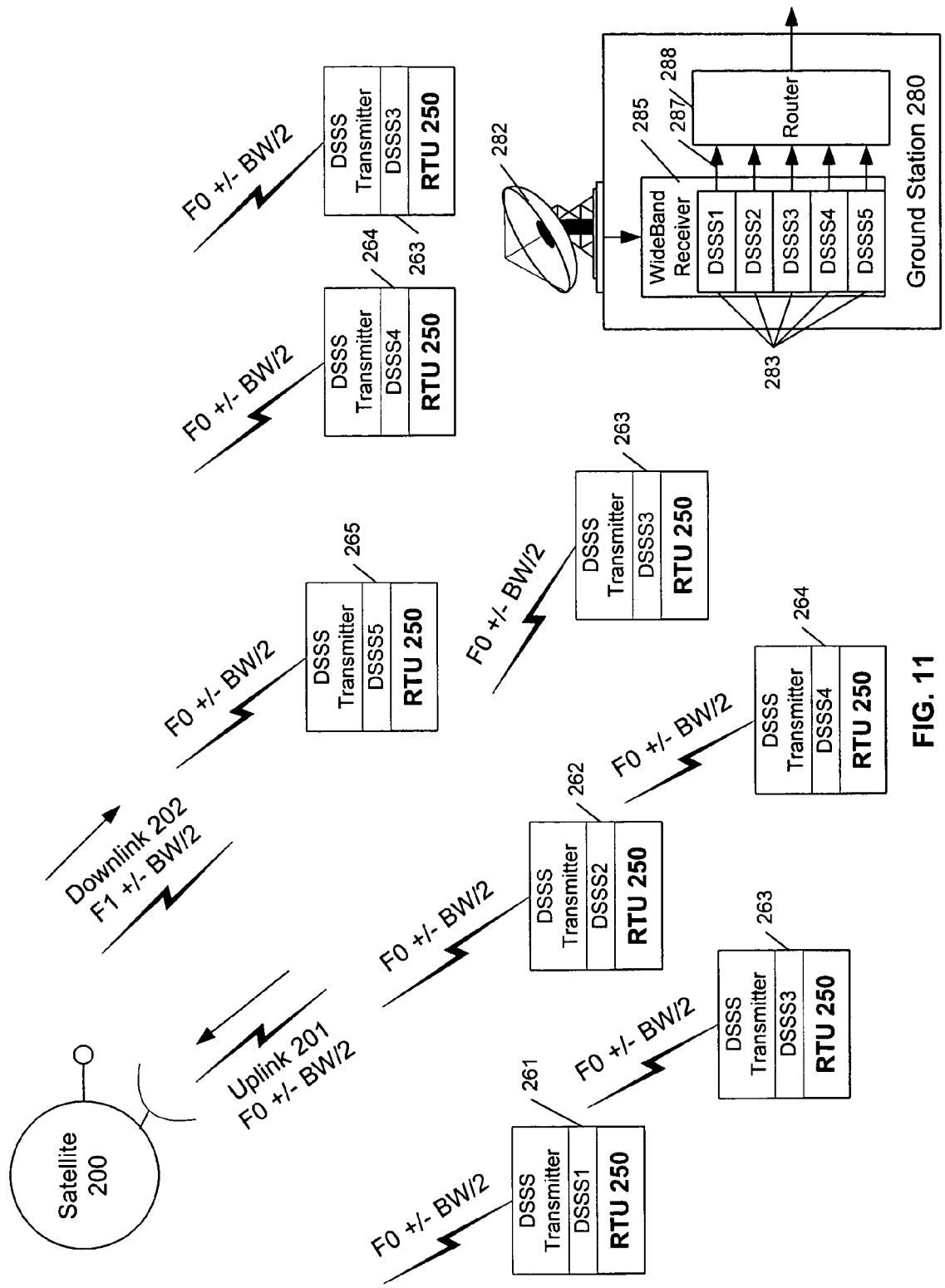
FIG. 11 illustrates a block diagram of an embodiment of a satellite communication system that uses CDMA/DSSS in accordance with an aspect of this invention.

FIG. 11 shows an embodiment of a satellite communications system that uses a Code Division Multiple Access (CDMA) transmission protocol. As in a typical CDMA system, this communication system uses Direct Sequence Spread Spectrum (DSSS) modulation scheme. A DSSS modulation is a linear modulation of a carrier frequency in accordance with a particular DSSS code value, typically via a binary phase shift key (BPSK) or similar modulation, such as PAM, QPSK, OQPSK, and MSK. Each transition of the particular DSSS code value introduces a phase shift of the carrier signal. A correlator at the receiving end applies an inverse of the same DSSS code value to the received signal; if the decoded result shows a strong correlation to an unmodulated carrier signal, the correlator locks onto the received signal and produces the decoded result as an output. If a strong correlation is not found, for example, because the received signal was encoded using a different DSSS code, the received signal is ignored. DSSS codes that produce modulations that are each strongly uncorrelated with each other are termed orthogonal DSSS codes. The size, or length, of the DSSS codes is determined so as to spread the modulated carrier signal across the entire bandwidth BW. FIG. 11 shows the use of five orthogonal DSSS codes, DSSS1, DSSS2, ... DSSS5 in RTUs 250, identified as RTUs 261, 262, ... 263 respectively. The ground station 280 of FIG. 11 includes a wideband receiver 285 that includes DSSS correlators 283 that produce decoded messages 287 corresponding to codes DSSS1, DSSS2, ... DSSS5. As in FIG. 10, the overlapping reception of transmissions that use the same DSSS code will result in a collision. However, as contrast to FDM, once a correlator 283 locks onto a particular received signal, the occurrence of another received signal using the same DSSS code that starts at a later time is, in general, ignored in the same way that other uncorrelated signals are ignored. This is because once the correlator 283 locks onto a signal, it maintains a time-dependent correlated relationship with the signal, sequencing through each bit value of the DSSS code. That is, a second received transmission using the same DSSS code will be ignored, but it will not adversely affect the first received transmission.

Note however, that in the embodiments of FIG. 10 and FIG. 11, the RTUs 250 are designed to have one of a fixed number of allocated frequencies or DSSS codes. To minimize the likelihood of collisions, RTUs 250 having the same allocated frequency or DSSS code should be uniformly distributed over the entire service area 100. In addition to the administrative overhead associated with allocating particular RTUs 250 to particular area, such an allocation may be impossible to enforce for mobile RTUs 250. Also, the allocation of resources at the ground station 280 is somewhat inefficient. If two RTUs 261 that use the same DSSS1 code are within the field of view 110 of the satellite 200 transmit coincidentally, one or both of the transmission messages will be lost due to a collision, even if no other RTUs 262, 263, 264, or 265 are transmitting. That is, the DSSS correlators 283 associated with DSSS codes DSSS2, DSSS3, DSSS4, and DSSS5 may be idle while messages transmitted with a DSSS1 code are being lost.

Figure 12:
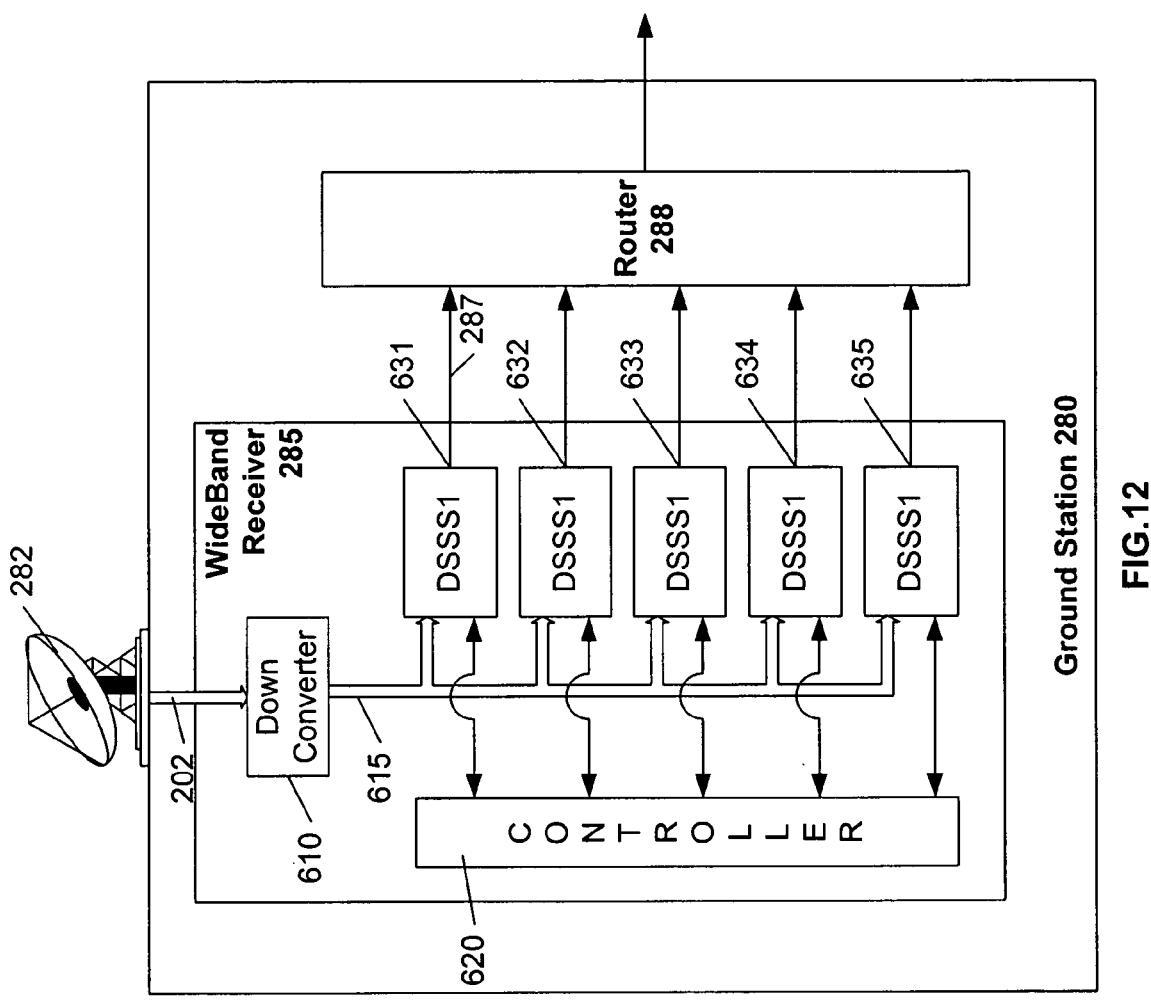
FIG. 12 illustrates a block diagram of an embodiment of a ground station that uses multiple DSSS correlators having the same DSSS code in accordance with an aspect of this invention.

FIG. 12 shows an embodiment of a ground station 280 that is optimized to reduce the likelihood of lost messages due to collisions. The ground station 280 is designed to provide communications to a plurality of RTUs 250 that use the same DSSS code; in this example, a plurality of RTUs 250 that use DSSS1 (illustrated as reference items 261 in FIG. 11). The wideband receiver 285 of the ground station 280 includes a down converter 610, a controller 620, and DSSS correlators 631 through 635 that use the same DSSS1 code to provide output signals 287. The controller 620 is operably coupled to each correlator 631-635, to provide a seek signal to each, and to receive a locked-on signal from each. The down-converter 610 extracts the RF information bandwidth BW from the downlink signal 202 to produce an intermediate signal 615. Initially, the controller 620 asserts the seek signal to correlator 631, and deasserts it to the other correlators 632-635. The seek signal instructs the selected correlator 631 to enter a seek mode, to search for a signal within the intermediate signal 615 that is strongly correlated to the DSSS1 code. When correlator 631 locks onto a received signal in the intermediate signal 615, it enters a locked-on mode, and notifies the controller 620. The controller 620 deasserts the seek signal to correlator 631, and asserts the seek signal to correlator 632. The correlator 631 proceeds to decode the correlated received signal, while the newly selected correlator 632 searches for another received signal that is correlated to the DSSS1 code. Because the correlator 632 is enabled for seeking after the start of the received signal that was detected by the correlator 631, the correlator 632 does not detect a strong correlation to this same received signal. When a second signal is received that is correlated to the DSSS1 code, the correlator 632 locks onto it and notifies the controller 620. Note that this receipt of a second correlated signal by correlator 632 is independent of whether the first correlated received signal is still being received and decoded by the correlator 631. Thereafter, the controller 620 deasserts the seek signal to the correlator 632 and asserts the seek signal to correlator 633, or to correlator 631 if correlator 631 deasserts its locked-on signal, indicating that the receipt of the first correlated signal has been completed. This process continues, such that the controller 620 enables each available correlator to seek until all correlators are unavailable because they are each receiving and decoding a received signal having a DSSS1 code. Thus, in this example embodiment, a message will not be lost because of a collision until all correlators are in use, thereby optimizing the use of resources within the ground station 280. In the preferred embodiment, each RTU 250 uses the same DSSS code. When the population density of RTUs 250 in a service area 100 increases to such an extent that collisions result in lost messages, the ground station need only be augmented to include additional correlators having this same DSSS code.

Figure 13:
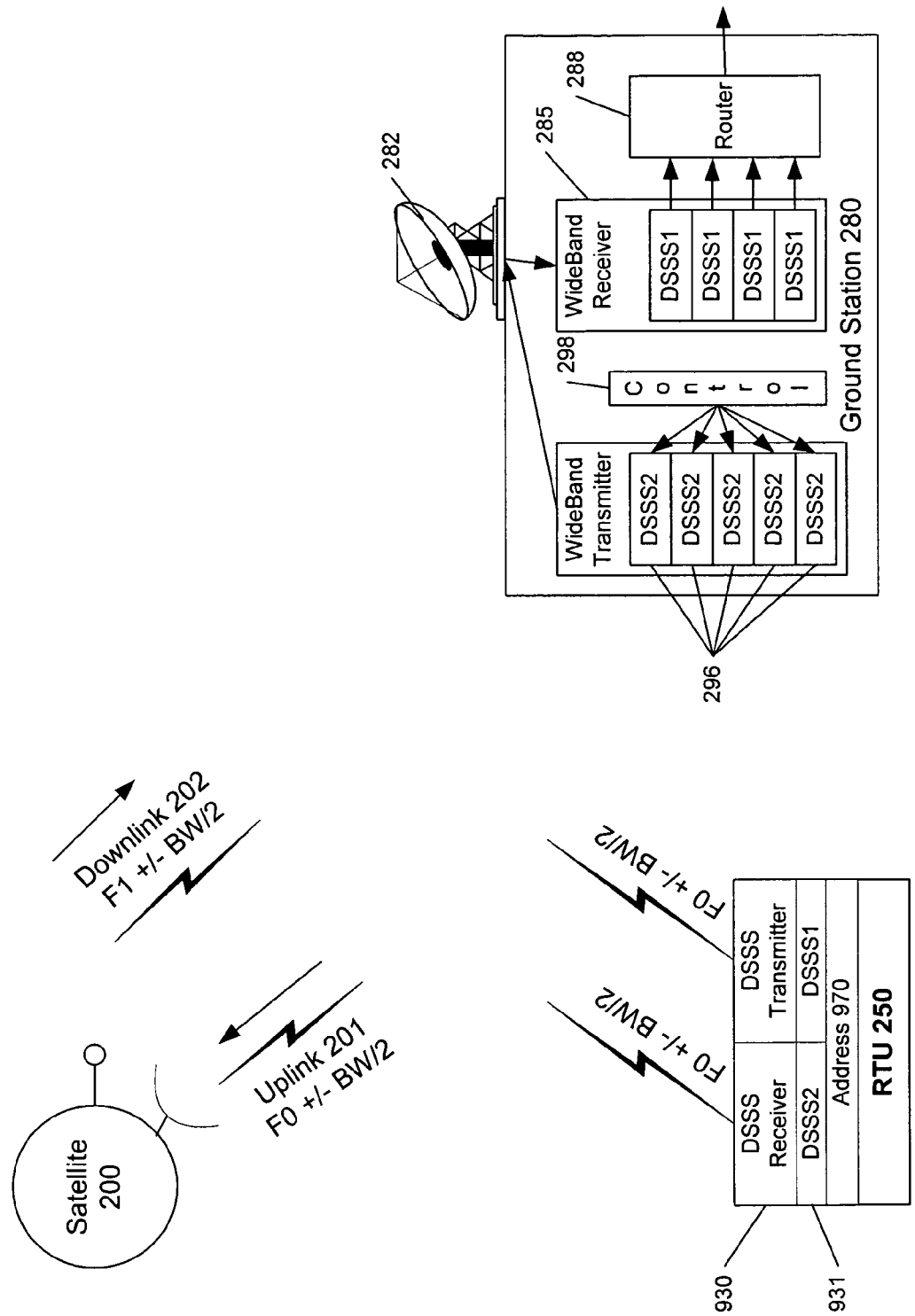
FIG. 13 illustrates a block diagram of an embodiment of a satellite communication system that uses CDMA for transmission and reception in accordance with an aspect of this invention.

FIG. 13 shows an embodiment of a satellite communication system that provides communications to and from the RTUs 250. Transmissions from the ground station 280 to the RTUs 250 that contain a receiver 930 use an orthogonal DSSS code to the RTUs 250 transmission DSSS code, to isolate each receiver 930 from interference from transmitting RTUs 250. As shown, in the preferred embodiment, the ground station 280 includes a wideband transmitter 290 that includes multiple DSSS modulators 296. In the preferred embodiment, each of the DSSS modulators 296 use the same DSSS code, shown as DSSS2 in FIG. 13. Using the same time-separated use of the same DSSS code presented above, the controller 298 enables each DSSS modulator selectively, such that the modulations do not begin at exactly the same time, but multiple modulations can be occurring at the same time. Each message sent from the ground station 280 will contain a target address, identifying the address 970 associated with each RTU. Each RTU 250 having a receiver 930 will demodulate the messages being sent from the ground station 280 and process the messages that contain the RTUs address 970 as the target address. The RTU receiver 930 contains a correlator 931 that has a seek mode and a locked-on mode. The correlator 931 will remain in the seek mode until it locks onto a message from the ground station 280. If the message contains the address of the RTU 250 as its target address, the correlator 931 will remain locked onto the message until it ends. As soon as the message is determined not to contain the address of the RTU 250 as the target address, the correlator 931 reenters the seek mode. The controller 298 enables each DSSS modulator 296 after the transmission of the portion of the message that contains the target address. In this manner, each RTU 250 may use the same DSSS code for the reception of messages from the ground station 280, while still allowing the ground station 280 to transmit multiple messages at the same time.

As in the example frequency-division multiplexing (FDM) system of FIG. 10, if a collision-free channel is required, such as for command and control of the spacecraft functions 390 of the satellite 200, a unique DSSS code may be allocated to an RTU 250' provide this channel. By providing a unique DSSS code that is orthogonal to the DSSS codes of the other RTUs 250, the communications via this channel will be collision-free, even though the channel shares the same frequency as the other RTUs 250.

The transmission messages 860 from each RTU may be conventional message packets, containing a source address, a destination address, and the information message 915 from the message source 910. The router 288 of the ground station 280, in FIGS. 10, 11, and 12 processes the received and decoded messages 287 and communicates the message to the location corresponding to the destination address, typically via conventional communication sources, such as telephone networks, internet, or other satellite systems.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although this invention is particularly well suited for RTUs 250 that communicate information to a ground station 280 for subsequent processing or communication to other systems, the system of this invention may also be used to communicate information from one RTU 250 to another RTU 250. In such an application, the ground station 280, or subsequent processing system, is configured to recognize that the destination of a message from an RTU 250 is another RTU 250, and is configured to subsequently retransmit the message to the other RTU 250, using the techniques disclosed above. Thus, for example, an RTU 250 may be configured to report malfunctions of a monitored device, and the reported malfunction may be relayed to an RTU 250 that is coupled to a PDA (Personal Data Assistant), or similar display device, that is carried by a repairperson. In such an application, some RTUs 250 may be configured as receive-only devices, such as pagers and the like. In like manner, although the communications system presented herein is particularly well suited for satellite communications, some or all of the principles of this invention may be applied to ground-based systems as well. For example, an inexpensive two-way paging system can be provided wherein each pager is configured to repeatedly transmit a confirmation message for a given duration, using a common DSSS code, and the ground-based base station is configured to distinguish among cotemporaneous acknowledgement messages from different pagers based on the different arrival times of at least some of the repeated messages. These and other system configuration and optimization features will be evident to one of ordinary skill in the art in view of this disclosure, and are included within the scope of the following claims.

The invention claimed is:

1. A satellite comprising:
    a spacecraft control system that is configured to control the satellite;
    a receiver that is configured to receive communications from a base station, on an uplink channel;
    a transmitter that is configured to transmit communications to the base station on a downlink channel;
    a controller that is configured to manage respective communications associated with the corresponding uplink and downlink channels; and
    a satellite-based remote terminal unit operably coupled to the receiver, the transmitter, and the spacecraft control system, that is configured to:
        monitor the communications from the base station for messages that are addressed to the satellite-based remote terminal unit,
        communicate the communications that are addressed to the satellite-based remote terminal unit to the spacecraft control system, and
        communicate messages from the spacecraft control system to the base station via the transmitter.

2. The satellite of claim 1, wherein:
the communications from the base station are modulated using a plurality of DSSS codes, and
the satellite-based remote terminal unit includes
    a DSSS demodulator that is configured to demodulate a predetermined DSSS code of the plurality of DSSS codes, and
the communications that are addressed to the satellite-based remote terminal unit are modulated using the predetermined DSSS code.

3. The satellite of claim 1, wherein:
the communications from one or more remote terminal units are modulated using one or more DSSS codes, and
the satellite-based remote terminal unit includes
    a DSSS modulator that is configured to modulate the messages using a predetermined DSSS code that differs from the one or more DSSS codes used by the remote terminal units.

4. The satellite s of claim 1, wherein:
the receiver is configured to provide the communications from the base station to the transmitter, and
the transmitter is further configured to
    provide the subsequent retransmission of the communications from the base station to one or more remote terminal units.

5. The satellite of claim 1, wherein:
the receiver is further configured to:
    receive the communications from a plurality of remote terminal units, and
    provide the communications from the plurality of remote terminal units to the transmitter for transmission to the base station.

\* \* \* \* \*